(12) United States Patent
Na et al.

(10) Patent No.: US 8,414,068 B1
(45) Date of Patent: Apr. 9, 2013

(54) VEHICLE BODY STRUCTURE

(75) Inventors: Wook Jin Na, Hwaseong-si (KR); Jong Chan Park, Hwaseong-si (KR)

(73) Assignees: Hyundai Motor Company, Seoul (KR); Kia Motors Corp., Seoul (KR)

( * ) Notice: Subject to any disclaimer, the term of this patent is extended or adjusted under 35 U.S.C. 154(b) by 0 days.

(21) Appl. No.: 13/493,471

(22) Filed: Jun. 11, 2012

(30) Foreign Application Priority Data

Dec. 13, 2011 (KR) .................. 10-2011-0133341

(51) Int. Cl.
*B62D 27/00* (2006.01)
(52) U.S. Cl. .............. 296/193.06; 296/178; 296/193.05

(58) Field of Classification Search .................. 296/178, 296/29, 30, 193.06, 203.03, 193.05; 403/231; 105/406.1
See application file for complete search history.

(56) References Cited

U.S. PATENT DOCUMENTS

| | | | | |
|---|---|---|---|---|
| 4,230,361 A | * | 10/1980 | Nachbur et al. | 296/30 |
| 5,116,161 A | * | 5/1992 | Faisst | 403/231 |

* cited by examiner

*Primary Examiner* — Joseph Pape
(74) *Attorney, Agent, or Firm* — Morgan, Lewis & Bockius LLP

(57) ABSTRACT

A vehicle body structure is configured such that not only can a pillar that is a vertical member of a vehicle body, for example, a bus, be joined to a rail that is a horizontal member without conducting a welding process, but also the strength of the vehicle body can be enhanced, thus preventing the generation of noise and vibrations, improving the durability of the vehicle body structure, and facilitating assembly work.

6 Claims, 4 Drawing Sheets

VEHICLE BODY STRUCTURE

CROSS-REFERENCE TO RELATED APPLICATIONS

The present application claims priority of Korean Patent Application Number 10-2011-0133341 filed Dec. 13, 2011, the entire contents of which application is incorporated herein for all purposes by this reference.

BACKGROUND OF INVENTION

1. Field of Invention

The present invention relates generally to a vehicle body structure and, more particularly, to a structure that joins members constituting a body of a bus to each other.

2. Description of Related Art

Typically, frames of conventional bus bodies are formed in such a way that hollow tubular members are bonded to each other. Pillars of the members that form the frames of the bus bodies are members which are disposed on sides of the vehicles and extend predetermined lengths vertically. Rails are members that extend predetermined lengths in the longitudinal direction of the vehicles. The junctions between the pillars and the rails are joined to each other by welding, a mechanical coupling method making use of rivets, bolts, etc., or a chemical coupling method making use of adhesive.

The frames of large vehicles such as buses must be able to support not only the large weight of a vehicle itself but also the weight of a large number of passengers and a load. In addition, generally, the traveling time and distance of the vehicles such as buses are comparatively long. Therefore, the junctions between the pillars and the rails must be sufficiently strong that vibrations or noise of the vehicles can be avoided and durability ensured.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Accordingly, the present invention has been made keeping in mind the above problems occurring in the prior art. Various aspects of the present invention provide for a vehicle body structure which is configured such that not only a pillar that is a vertical member of a vehicle body, for example, a bus, can be joined to a rail that is a horizontal member without conducting a welding process, but the strength of the vehicle body can also be enhanced, thus preventing the generation of noise and vibrations, improving the durability of the vehicle body structure, and facilitating assembly work.

Various aspects of the present invention provide for a vehicle body structure, including a pillar having a coupling slot integrally formed in a surface thereof, a rail joined to the surface of the pillar, the rail having a coupling slot integrally formed in a surface thereof that is joined to the surface of the pillar, a corner bracket coupled to a corner formed between the joined surfaces of the pillar and the rail, and a fastening unit fastening the corner bracket to the coupling slots of the pillar and the rail.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
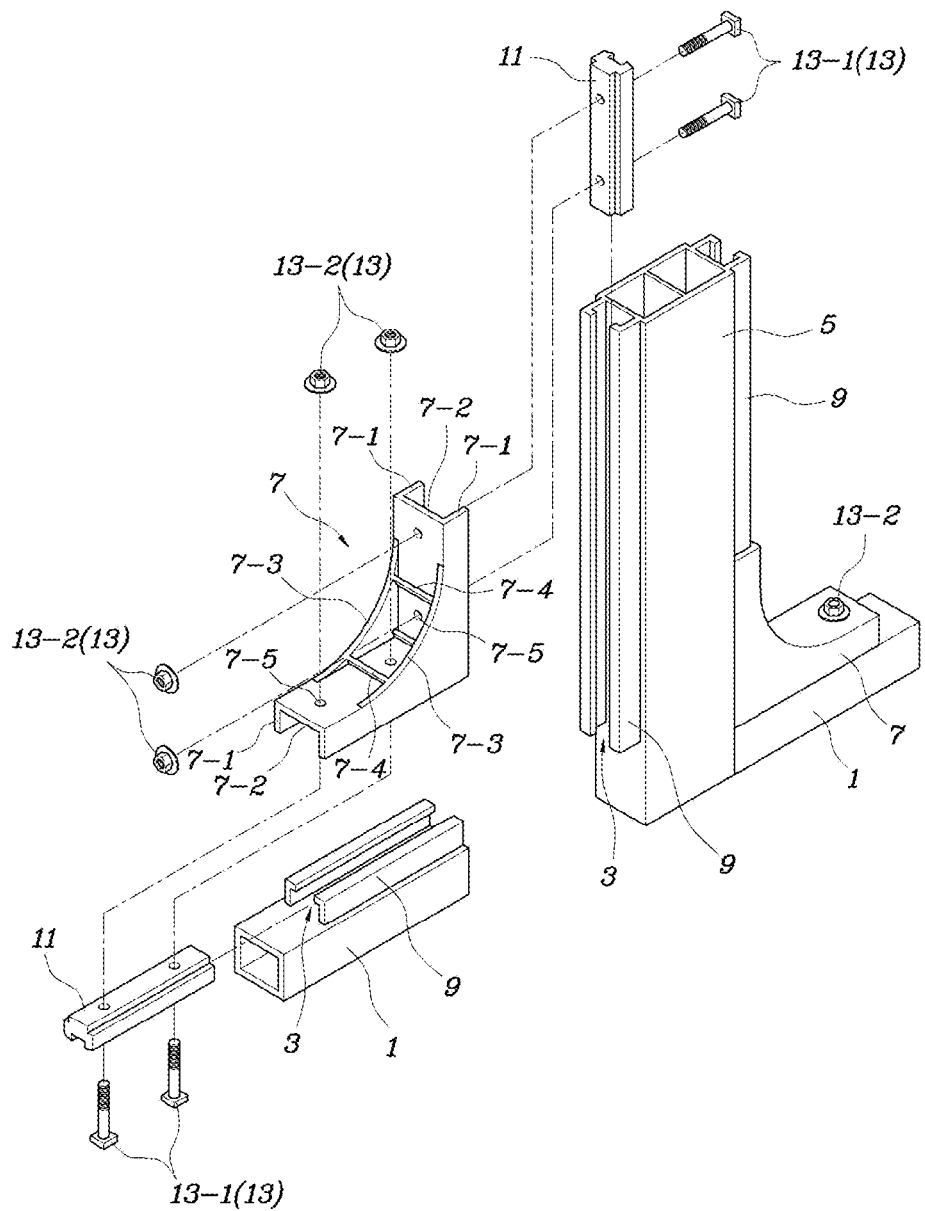
FIG. 1 is a view illustrating an exemplary vehicle body structure according to the present invention.
Figure 2:
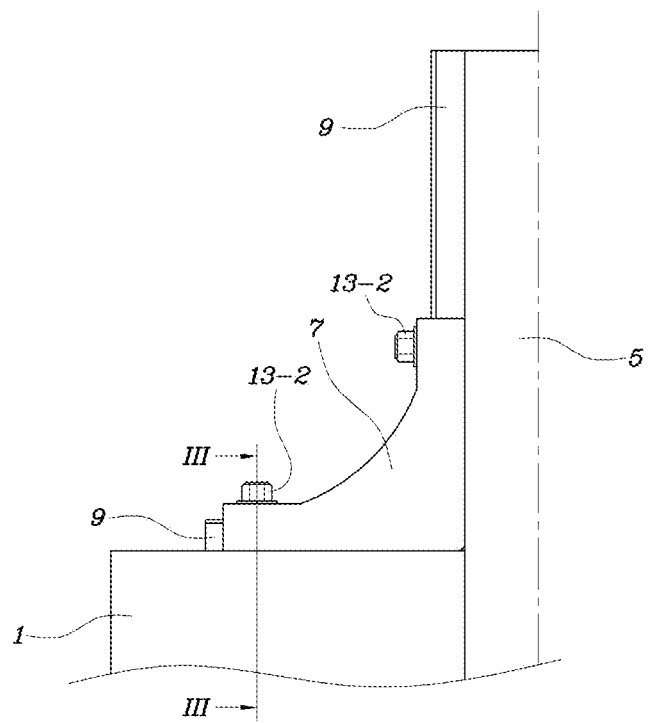
FIG. 2 is a front view showing the coupling of a pillar to a rail of FIG. 1.
Figure 3:
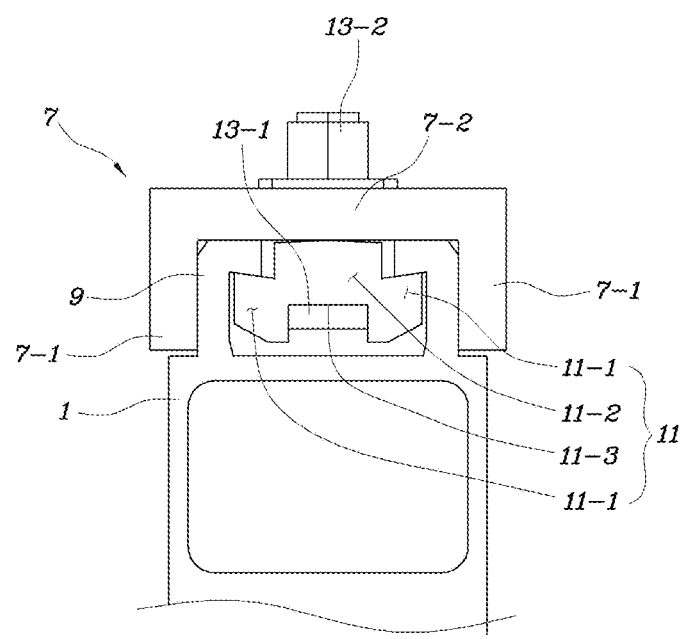
FIG. 3 is a sectional view taken along the line III-III of FIG. 2.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIGS. 1 through 7, a vehicle body structure according to various embodiments of the present invention includes a pillar 5, a rail 1, a corner bracket 7 and a fastening unit. A coupling slot 3 is integrally and/or monolithically formed in a surface of the pillar 5 that is joined to the rail 1. The rail 1 also has a coupling slot 3 which is integrally and/or monolithically formed in a surface of the rail 1 that is joined to the pillar 5. The corner bracket 7 is coupled to the corner formed between the surfaces of the pillar 5 and the rail 1 that are joined to each other. The fastening unit fastens the corner bracket 7 to the coupling slots 3 of the pillar 5 and the rail 1.

That is, in the present invention, the pillar 5 is oriented vertically, and the coupling of the pillar 5 to the rail 1 that are oriented horizontally makes use of the corner bracket 7 and the coupling slots 3 formed in the pillar 5 and the rail 1. Therefore, the present invention does not require a separate welding process and can facilitate assembly and provide high strength.

In various embodiments, each of the coupling slots 3 of the pillar 5 and the rail 1 is formed by a coupling guide 9 that protrudes from the corresponding surface of the pillar 5 or the rail 1. The coupling guide 9 comprises two hook-shaped cross-sectional parts that face each other. The fastening unit includes a carrier 11 which is inserted between the two hook-shaped cross-sectional parts of the coupling guide 9, and fasteners 13 which are tightened into the carrier 11 and the corner bracket 7 so that the carrier 11 and the corner bracket 7 are compressed to each other, thus maintaining the coupled state therebetween.

In other words, the coupling guide 9 integrally and/or monolithically protrudes from the corresponding surface of the pillar 5 or the rail 1 and forms the coupling slot 3. The cross-sectional shape of the coupling guide 9 is a shape in which two hooks are provided on opposite sides so that the carrier 11 which has been inserted into the coupling guide 9 can be prevented from being removed in the direction in which the coupling guide 9 protrudes. After the carriers 11 have been inserted into the coupling guides 9 of the pillar 5 and the rail 1, the fasteners 13 are tightened into the carriers 11 and the corner bracket 7 to apply compressive force to the carriers 11 and the corner bracket 7. As a result, the coupling force between the pillar 5 and the rail 1 can be finally ensured.

The carrier 11 integrally and/or monolithically includes two stop protrusions 11-1, a central part 11-2 and a fastener insert depression 11-3. The two stop protrusions 11-1 are brought into close contact with and are hooked to the two hook-shaped cross-sectional parts of the coupling guide 9. The central part 11-2 is disposed between the two stop protrusions 11-1 and protrudes towards the corner bracket 7 through the space between the hook-shaped cross-sectional parts. The fastener insert depression 11-3 is formed at a position opposite to the central part 11-2 and depressed between the two stop protrusions 11-1 so that one end of the fastener 13 is inserted into the fastener insert depression 11-3. The carrier 11 extends a predetermined length along the longitudinal direction of the coupling guide 9.

As such, the shape of the carrier 11 is that of a long bar having a predetermined cross-sectional shape such that it is inserted into the coupling guide 9 and is slidable. Thanks to the above-mentioned cross-sectional shape of the carrier 11, not only can the above-stated compressive force between the carrier 11 and the corner bracket 7 be more reliably ensured, increasing the coupling force therebetween, but the carrier 11 can also be prevented from being deformed by a load applied to the vehicle body, thus enhancing the strength of the vehicle body.

Each fastener 13 includes a fastening bolt 13-1 and a fastening nut 13-2. The fastening bolt 13-1 is configured such that a head thereof is inserted into the fastener insert depression 11-3 of the carrier 11 and prevented from rotating.

Therefore, when the fastening nut 13-2 is tightened over the fastening bolt 13-1 that protrudes from the corner bracket 7 via the carrier 11, the coupling guide 9 and the corner bracket 7, the fastener insert depression 11-3 prevents the head of the fastening bolt 13-1 from rotating. Thus, tightening the fastening nut 13-2 over the fastening bolt 13-1 can be facilitated, thereby making the assembly work easier.

Of course, in addition to the fastener proposed in various embodiments, any type of mechanical fastener, for example, a rivet, etc., may be used, as long as it can provide compressive force between the carrier 11 and the corner bracket 7.

The corner bracket 7 includes channel parts 7-2, reinforcing plates 7-3 and reinforcing ribs 7-4. The channel parts 7-2 are connected to each other and cover the two corresponding coupling guides 9. Each channel part 7-2 includes flanges 7-1 which cover the opposite outer surfaces of the two hook-shaped cross-sectional parts of the corresponding coupling guide 9. The reinforcing plates 7-3 are integrally and/or monolithically provided on the corner of the junction between the channel parts 7-2 that are connected to each other. The reinforcing ribs 7-4 are provided between the reinforcing plates 7-3.

Figure 4:
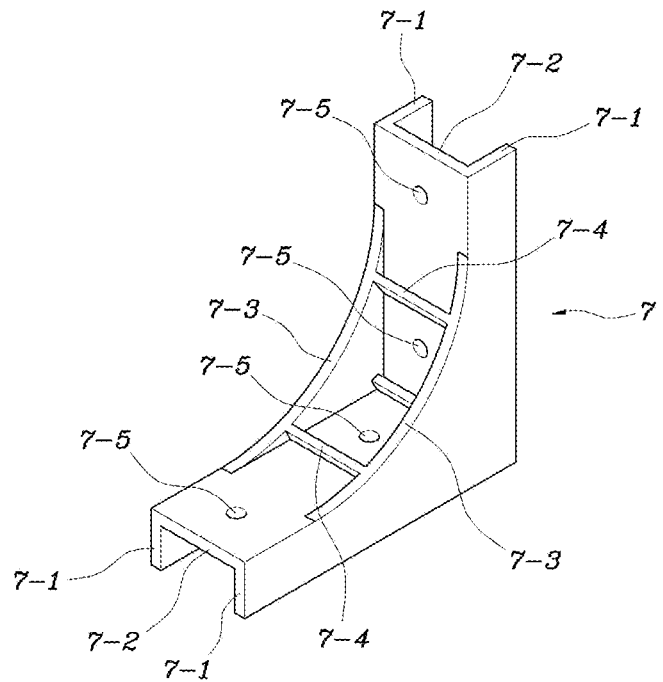
FIGS. 4 through 6 are views showing exemplary corner brackets according to the present invention.
Figure 5:
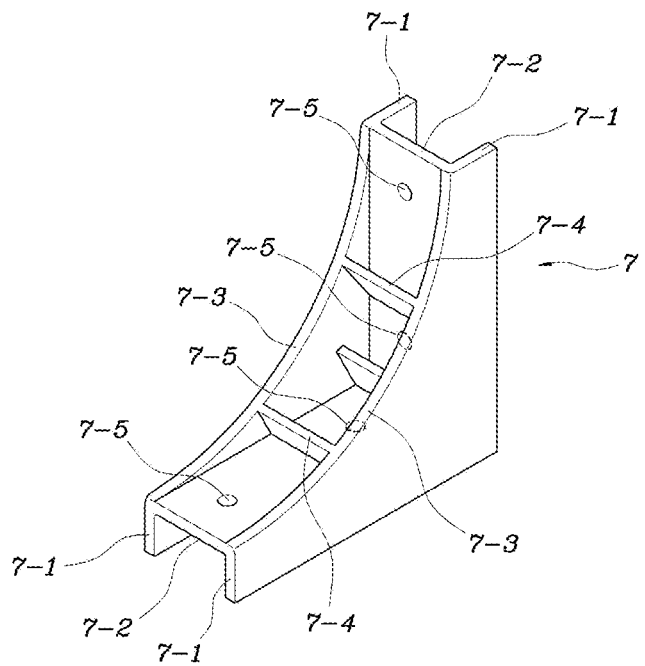
Figure 6:
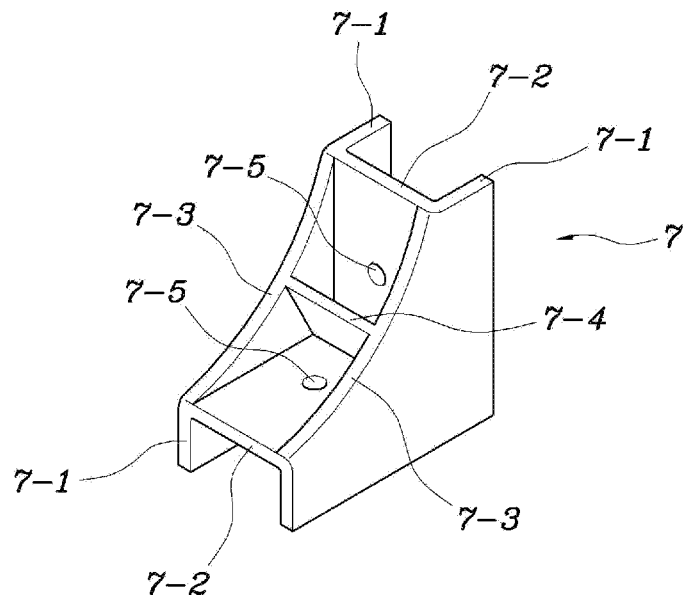

FIGS. 4 through 6 are views showing exemplary corner brackets having the above-mentioned structure. The particular configuration of corner bracket 7 will be able to be selectively used depending on the characteristics and conditions of the installation location.

In the channel parts 7-2 of the corner bracket 7, at least one fastening hole 7-5 into which the fastener 13 is inserted is formed through each of two junction surfaces that are connected to each other. In the case of a plurality of fastening holes 7-5 being formed in each channel part 7-2, they may be arranged in a row in the longitudinal direction the coupling guide 9. For reference, in the corner bracket illustrated in FIGS. 4 and 5, two fastening holes 7-5 are formed in one surface of each channel part 7-2. In various embodiments including that of FIG. 6, a single fastening hole 7-5 is formed in one surface of each channel part 7-2.

In various embodiments, each of the reinforcing plates 7-3 which connect the two-joined channel parts 7-2 to each other has an arc shape, thus enhancing the strength of the entire corner bracket 7 including the two channel parts 7-2 and, moreover, enhancing the coupling strength between the rail 1 and the pillar 5.

Figure 7:
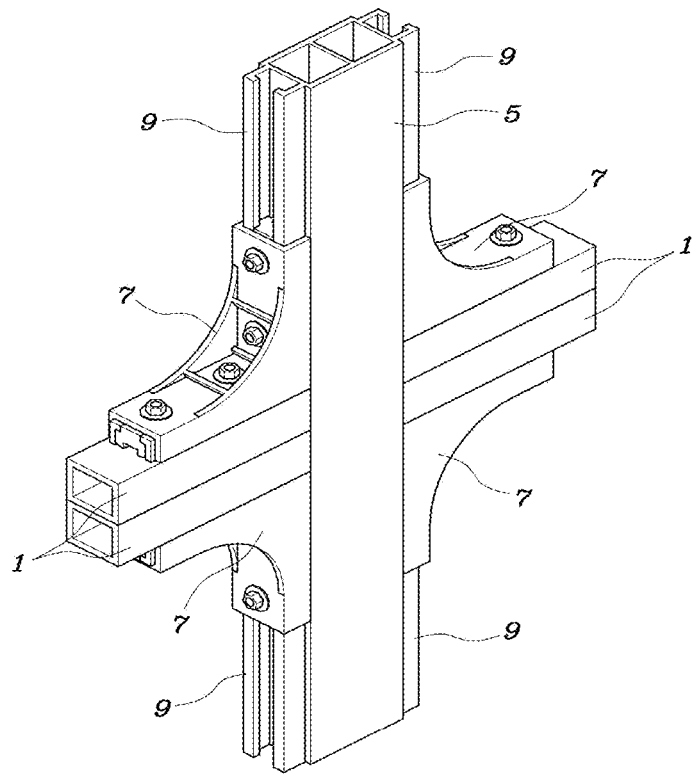
FIG. 7 is a view showing an exemplary vehicle body structure according to the present invention.

FIG. 7 is a view showing a vehicle body structure configured by various embodiments of the present invention. A joint part between a lower portion of a window pillar, which is an important part of the joint connection structure of a bus body, and waist rails will be able to be configured by the present invention, as shown in the drawing.

In detail, the pillar 5 extends a predetermined length in the vertical direction and is disposed between two rails 1 which are horizontally arranged in a line. The coupling guide 9 is not formed on the pillar 5 at the junction with each rail 1 so that the end of the rail 1 can come into direct contact with the surface of the pillar 5. The width of the coupling guide 9 of the pillar 5 is the same as that of the coupling guide 9 of the rail 1.

In the vehicle body structure of the present invention, adhesive may be applied between the carriers 11 and the coupling guides 9 and between the coupling guides 9 and the corner bracket 7, thus further enhancing the coupling strength therebetween.

As described above, a vehicle body structure according to the present invention which is configured such that not only a pillar that is a vertical member of a vehicle body, for example, a bus, can be joined to a rail that is a horizontal member without conducting a welding process, but the strength of the vehicle body can also be enhanced. Therefore, the present invention can prevent noise and vibrations from being generated and improve the durability of the vehicle body structure. Further, the present invention can facilitate assembly work.

For convenience in explanation and accurate definition in the appended claims, the terms upper or lower, front or rear, inside or outside, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle body structure, comprising:
a pillar having a coupling slot integrally in a surface thereof;
a rail abutting against the surface of the pillar, the rail having a coupling slot integrally formed in a surface thereof that is abutting against the surface of the pillar;
a corner bracket coupled to a corner formed between abutting surfaces of the pillar and the rail;
a fastening unit fastening the corner bracket to the coupling slots of the pillar and the rail; and wherein each of the coupling slots of the pillar and the rail is defined by a coupling guide protruding from the surface of the pillar or the surface of the rail, the coupling guide comprising two hook-shaped cross-sectional parts facing each other;

wherein the fastening unit includes a carrier inserted between the two hook-shaped cross-sectional parts of the coupling guide, and a fastener tightened into the carrier and the corner bracket so that the carrier and the corner bracket are compressed toward each other, thus maintaining a coupled state therebetween; and wherein the rail comprises two rails arranged in a line in a horizontal direction, and the pillar extends a predetermined length in a vertical direction and is disposed between the two rails;

the coupling guide of the pillar is formed on a portion of the pillar other than a junction with the rail so that an end of the rail comes into direct contact with the surface of the pillar;

a width of the coupling guide of the pillar is equal to a width of the coupling guide of the rail.

2. The vehicle body structure as set forth in claim 1, wherein the carrier extends a predetermined length along a longitudinal direction of the coupling guide, and wherein the carrier comprises:

two stop protrusions coming into close contact with and hooked to the two hook-shaped cross-sectional parts of the coupling guide;

a central part disposed between the two stop protrusions, the central part protruding towards the corner bracket through a space between the hook-shaped cross-sectional parts; and a fastener insert depression formed at a position opposite the central part and depressed between the two stop protrusions so that one end of the fastener is inserted into the fastener insert depression.

3. The vehicle body structure as set forth in claim 2, wherein the fastener comprises a fastening bolt and a fastening nut; and the fastening bolt has a head inserted into the fastener insert depression of the carrier and coupled thereto such that the head of the fastening bolt is prevented from rotating.

4. The vehicle body structure as set forth in claim 1, wherein the corner bracket comprises:

channel parts connected to each other, the channel parts covering the coupling guide of the pillar and the coupling guide of the rail, each of the channel parts comprising flanges covering opposite outer surfaces of the two hook-shaped cross-sectional parts of the corresponding coupling guide;

reinforcing plates integrally provided on a corner of a junction between the channel parts that are connected to each other; and a reinforcing rib provided between the reinforcing plates.

5. The vehicle body structure as set forth in claim 4, wherein at least one fastening hole is formed through each of two junction surfaces of the channel parts of the corner bracket that are connected to each other.

6. The vehicle body structure as set forth in claim 1, wherein adhesive is applied between the carrier and the coupling guide and between the coupling guide and the corner bracket.

\* \* \* \* \*